US012663964B2

(12) United States Patent
Chan et al.

(10) Patent No.: US 12,663,964 B2
(45) Date of Patent: Jun. 23, 2026

(54) MEMORY DEVICE WITH IN-MEMORY COMPUTING ARCHITECTURE AND COMPUTING METHOD THEREOF

(71) Applicant: Winbond Electronics Corp., Taichung City (TW)

(72) Inventors: Johnny Chan, Fremont, CA (US); Chi-Shun Lin, Fremont, CA (US)

(73) Assignee: Winbond Electronics Corp., Taichung City (TW)

( * ) Notice: Subject to any disclaimer, the term of this patent is extended or adjusted under 35 U.S.C. 154(b) by 1069 days.

(21) Appl. No.: 17/693,406

(22) Filed: Mar. 13, 2022

(65) Prior Publication Data

US 2023/0289143 A1 Sep. 14, 2023

(51) Int. Cl.
*G06F 7/544* (2006.01)
*G06F 17/16* (2006.01)

(52) U.S. Cl.
CPC ............ *G06F 7/5443* (2013.01); *G06F 17/16* (2013.01)

(58) Field of Classification Search
CPC ............................... G06F 7/5443; G06F 17/16
See application file for complete search history.

(56) References Cited

U.S. PATENT DOCUMENTS

| | | | |
|---|---|---|---|
| 10,381,071 B1 | 8/2019 | Si et al. | |
| 11,188,344 B2 | 11/2021 | Hou et al. | |
| 2021/0005230 A1* | 1/2021 | Wang | G11C 11/412 |
| 2021/0073619 A1* | 3/2021 | Wang | G06N 3/04 |
| 2021/0208884 A1* | 7/2021 | Song | G06F 7/5443 |

FOREIGN PATENT DOCUMENTS

| | | |
|---|---|---|
| CN | 112992232 | 6/2021 |
| TW | I714003 | 12/2020 |

* cited by examiner

*Primary Examiner* — Michael D. Yaary
(74) *Attorney, Agent, or Firm* — JCIPRNET

(57) ABSTRACT

A memory device and a computing method are provided. The memory device includes a memory array, comprising a first and second memory blocks, and a comparator. The first memory block performs a multiplication and accumulation (MAC) operation according to a first weight matrix and a first input matrix to generate a first sum. The second memory block performs the MAC operation according to a second weight matrix and a second input matrix to generate a second sum. The comparator compares the first and second sums. In a first configuration, each value of the input and second input matrixes are the same and each value of the first and second weight matrixes are complements. In a second configuration, each value of the first and second input matrixes are complements and each value of the first and second weight matrixes are the same.

17 Claims, 13 Drawing Sheets

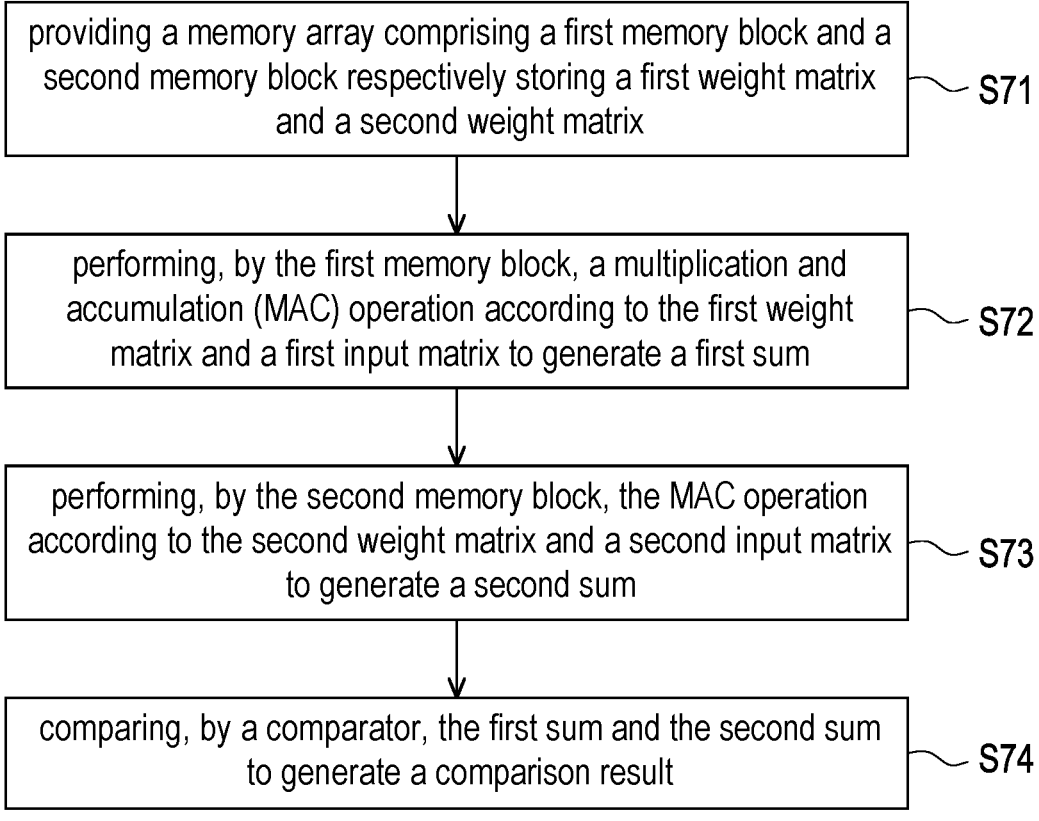

providing a memory array comprising a first memory block and a second memory block respectively storing a first weight matrix and a second weight matrix     S71 performing, by the first memory block, a multiplication and accumulation (MAC) operation according to the first weight matrix and a first input matrix to generate a first sum     S72 performing, by the second memory block, the MAC operation according to the second weight matrix and a second input matrix to generate a second sum     S73 comparing, by a comparator, the first sum and the second sum to generate a comparison result     S74

FIG. 7

MEMORY DEVICE WITH IN-MEMORY COMPUTING ARCHITECTURE AND COMPUTING METHOD THEREOF

BACKGROUND

1. Technical Field

The disclosure generally relates to a device and a method, more particularly, to a memory device and a computing method.

2. Description of Related Art

Through the development of machine learning, deep learning, and artificial intelligence, etc., a memory device with in-memory computing (ICM) architecture have been widely applied for accelerating computation speed. To read out a summation current of the memory device with ICM architecture, the memory architecture and sensing reference are design challenge to achieve low power and high speed.

SUMMARY

The present disclosure is directed to a memory device and a computing method for comparing inputs and weights through in memory computation.

The memory device of the present disclosure includes a memory array comprising a first memory block, a second memory block, and a comparator. The first memory block stores a first weight matrix, receives a first input matrix, and performs a multiplication and accumulation (MAC) operation according to the first weight matrix and the first input matrix to generate a first sum. The second memory block stores a second weight matrix, receives a second input matrix, and performs the MAC operation according to the second weight matrix and the second input matrix to generate a second sum. The comparator compares the first sum and the second sum to generate a comparison result. In a first configuration, each value of the first input matrix and the second input matrix are the same and each value of the first weight matrix and the second weight matrix are complements. In a second configuration, each value of the first input matrix and the second input matrix are complements and each value of the first weight matrix and the second weight matrix are the same.

The computing method of the present disclosure includes: providing a memory array comprising a first memory block and a second memory block respectively storing a first weight matrix and a second weight matrix; performing, by the first memory block, a multiplication and accumulation (MAC) operation according to the first weight matrix and a first input matrix to generate a first sum; performing, by the second memory block, the MAC operation according to the second weight matrix and a second input matrix to generate a second sum; comparing, by a comparator, the first sum and the second sum to generate a comparison result. In a first configuration, each value of the first input matrix and the second input matrix are the same and each value of the first weight matrix and the second weight matrix are complements. In a second configuration, each value of the first input matrix and the second input matrix are complements and each value of the first weight matrix and the second weight matrix are the same.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 7 illustrates a flowchart of a computing method according to some embodiments of the present disclosure.

DESCRIPTION OF THE EMBODIMENTS

Figure 1A:
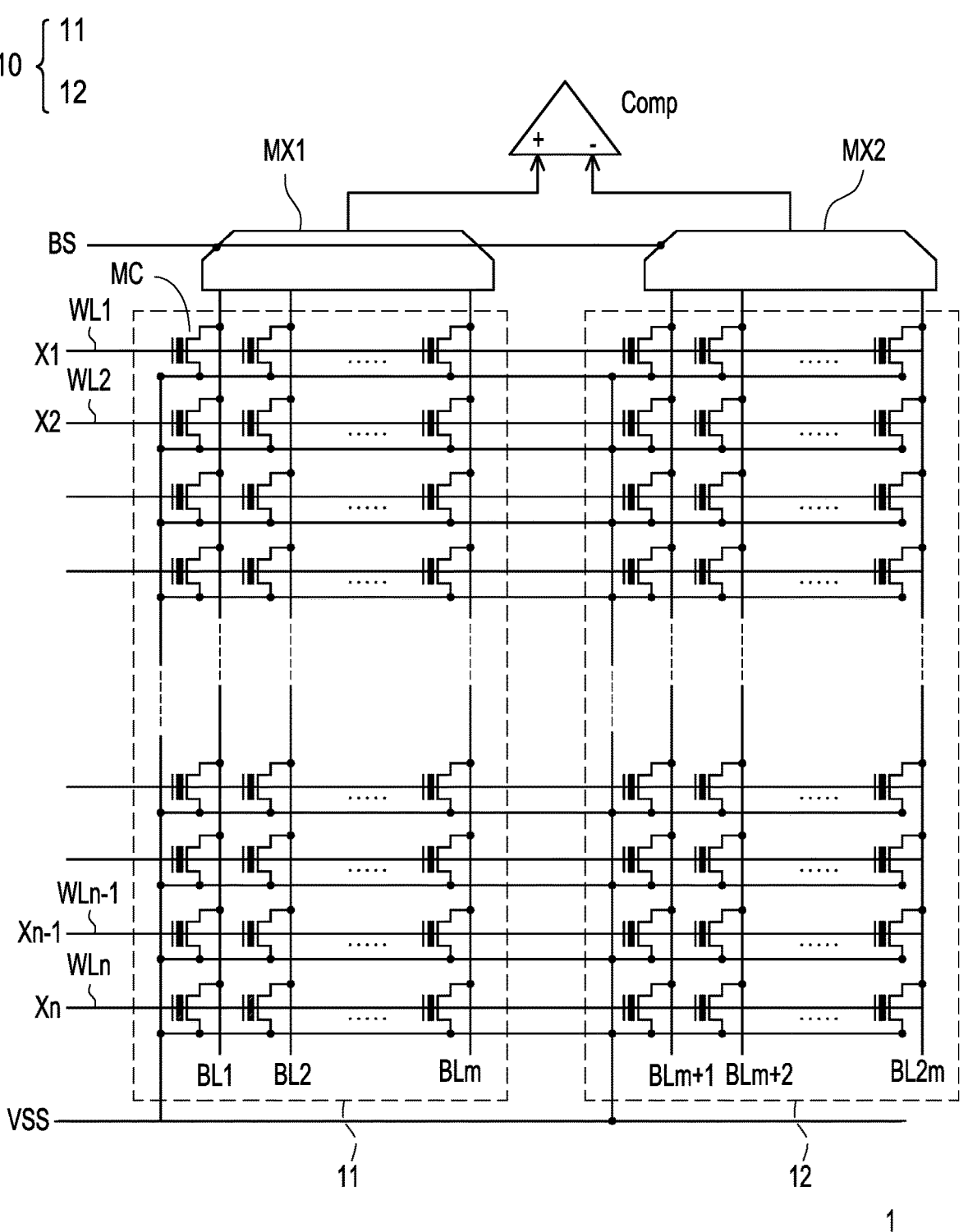
FIG. 1A illustrates a memory device according to some embodiments of the present disclosure.

FIG. 1A illustrates a memory device 1 according to some embodiments of the present disclosure. The memory device 1 includes a memory array 10. The memory array 10 includes memory blocks 11, 12. The memory blocks 11, 12 comprises a plurality of memory cells MC.

The memory block 11 stores a first weight matrix and the memory block 12 stores a second weight matrix. The first memory block 11 is configured to receive a first input matrix and perform a multiplication and accumulation (MAC) operation according to the first input matrix and the first weight matrix to generate a first sum. The second memory 12 is configured to receive the first input matrix and perform the MAC operation according to the first input matrix and the second weight matrix to generate a second sum. Then, a comparator Comp compares the first sum and the second sum to generate a comparison result.

In some embodiments, the memory device 1 is operated under a first configuration. In the first configuration, the memory blocks 11 and 12 receive the same first input matrix comprised by input values X1-Xn. In addition, the memory blocks 11, 12 respectively stores the first weight matrix and the second weight matrix, which store complementary or inversed weight values inside. Particularly, the first weight matrix and the second weight matrix have the same size with n rows and m columns, rendering the first weight matrix and the second weight matrix both comprise n times m weight values. Each weigh value of the first weight matrix and the second weight matrix is a data in Boolean form (i.e. 1 and 0), and stored by each memory cell MC of the memory blocks 11, 12. The first weight matrix and the second weight matrix being complementary is that the weight values of the first weight matrix and the second weight matrix at a same position (i.e. at the same column and the same row) are inverted, while one is 1 and another one is 0. That is, when a weight value of the first weight matrix is 1, another weight value at the same column and row of the second weight matrix is 0.

The memory blocks 11, 12 are arranged in n rows and m columns, and there are total n times m of memory cells MC arranged in each of the memory blocks 11, 12. Each memory cell MC in the memory block 11 is connected between one of word lines WL1-WLn and one of bit lines BL1-BLm, and each memory cell MC in the memory block 12 is connected between one of word lines WL1-WLn and one of bit lines BLm+1 to BL2m. The memory cells MC in the same row are connected to the same word line in order to receive the same input value of the first input matrix, and the memory cells MC in the same column are connected to the same bit line. In addition, each memory cell MC is controlled by the word line to selectively conduct a connection between the bit line and a reference voltage VSS.

In some embodiments, an electrical characteristic of each memory cell MC may be programmed to store the corresponding weight value. For example, for a single level cell (SLC), a threshold voltage or a resistance of the memory cells MC may be programmed into a high level or a low level to store the weight value. Taking programming the threshold voltage as an example, the threshold voltage of the memory cell MC may be programmed in a high level to store the weight value 0, and the threshold voltage of the memory cell MC may be programmed in a low level to store the weight value 1. Therefore, the memory cell MC is in an ON state and being conducted to drain a current from the bit line when both of the input value received and the weight value stored by the memory cell are 1, and otherwise, the memory cell MC is in an OFF state and being cutoff.

It can be regarded as each memory cell MC performs a AND operation according to the input value received and the weight value stored. The memory cell drains a current from the bit line when the input value received and the weight value stored are both 1. The memory cells MC in the same column perform respective multiplication operation to determine whether to drain a current from the same bit line. The total current drained from each bit line corresponds to a sum of product of each column. Therefore, the current drained from the bit lines BL1-BLm form a first sum matrix, and the current drained from the bit lines BLm+1 to BL2m form a second sum matrix.

The MAC operation performed by the memory blocks 11, 12 can be referred as follows.

$$[X1 \ ... \ Xn] \begin{bmatrix} W1,1 & \cdots & W1,m \\ \vdots & \ddots & \vdots \\ Wn,1 & \cdots & Wn,m \end{bmatrix} = [A1 \ ... \ Am]$$

$$[X1 \ ... \ Xn] \begin{bmatrix} !W1,1 & \cdots & !W1,m \\ \vdots & \ddots & \vdots \\ !Wn,1 & \cdots & !Wn,m \end{bmatrix} = [B1 \ ... \ Bm]$$

X1-Xn are the input values of the first input matrix. W1,1 to Wn,m are the weight values of the first weight matrix, and !W1,1 to !Wn,m are the weight values of the second weight matrix, which stores complement or inverted weights of the first weight matrix. A1-Am are sum values of the first sum matrix, and B1-Bm are sum values of the second sum matrix.

In some embodiments, a multiplexer MX1 is coupled to the memory block 11 through bit lines BL1 to BLm, and a multiplexer MX2 is coupled to the memory block 12 through the bit lines BLm+1 to BL2m. The multiplexers MX1 and MX2 are controlled by a bit line select signal BS, so a pair of corresponding bit lines of the memory blocks 11, 12 may be connected to the comparator Comp for comparison simultaneously. For example, at first, the multiplexers MX1, MX2 may respectively select and connect the bit lines BL1, BLm+1 to the comparator Comp for comparison. The comparator Comp receives a first sum from the bit line BL1 and a second sum from the BLm+1 to BL2m. The first sum and the second sum may be respectively converted from the total currents drained from the bit line BL1, BLm+1, which will be described more detailed in paragraphs below. The comparator Comp may compare the first sum and the second sum to generate a comparison result. Then, the multiplexers MX1, MX2 may select and connect the bit lines BL2, BLm+2 to the comparator Comp, and so on, so comparison results of all columns of the first sum matrix and the second sum matrix may be obtained.

Figure 1B:
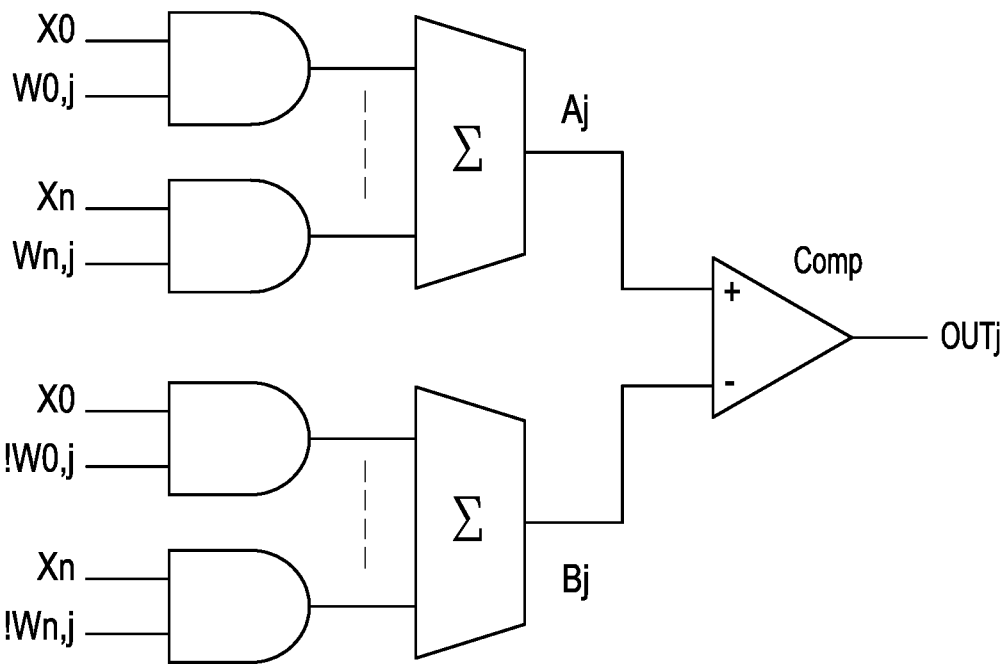
FIG. 1B illustrates an equivalent circuit of how the comparator Comp compares the first sum and the second sum of a selected column as illustrated in FIG. 1A.

FIG. 1B illustrates an equivalent circuit of how the comparator Comp compares the first sum Aj and the second sum Bj of a selected jth column as illustrated in FIG. 1A. Since each memory cell MC in the memory blocks 11, 12 performs an AND operation according to the input values received and the stored weight value, each memory cell MC functions equivalently as an AND gate. The input values of the first input matrix respectively multiply by the weight values of a selected column of the first weight matrix and the second weight matrix. The products generated by the memory cells MC are being summed up on the bit lines and provided to the comparator Comp for generating the comparison result OUTj. Specifically, the first sum Aj corresponds to how many is (i.e. logical true) in the first input matrix are matched to the selected column of the first weight matrix, while the second sum Bj corresponds to how many is in the first input matrix are unmatched to the selected column of the first weight matrix. In order to compare the amount of the matched 1s and unmatched 1s in the first input matrix, the comparator Comp generates the comparison result OUTj by subtracting the second sum Bj from the first sum Aj. When the first sum Aj is greater than the second sum Bj, that means the amount of matched 1s is greater than the amount of unmatched 1s, the comparator Comp outputs the comparison result OUTj to be 0 (i.e. with a relatively low voltage). When the first sum Aj is less than the second sum Bj, that means the amount of matched 1s is less than the amount of unmatched, the comparator Comp outputs the comparison result OUTj to be 1 (i.e. with a relatively high voltage).

In some embodiments, a comparator threshold of the comparator Comp may be 50%. That is, when the comparison result OUTj is 1, there will be over 50% of 1s in the first input matrix to be matched with the selected column of the first weight matrix. When the comparison result OUTj is 0, there will be less than 50% of 1s in the first input matrix to be matched with the selected column of the first weight matrix.

In some embodiments, the comparison between the first input matrix and the first weight matrix may be applied to image recognition, fingerprint identification, etc.

In brief, the memory device 1 may be operated under the first configuration. In the first configuration, the memory blocks 11, 12 respectively stores the first weight matrix and the second weight matrix which are complementary or inverted while receiving the same first input matrix. Therefore, the first input matrix and the first weight matrix may be compared through the AND operation to generate the corresponding comparison result OUT.

Figure 2A:
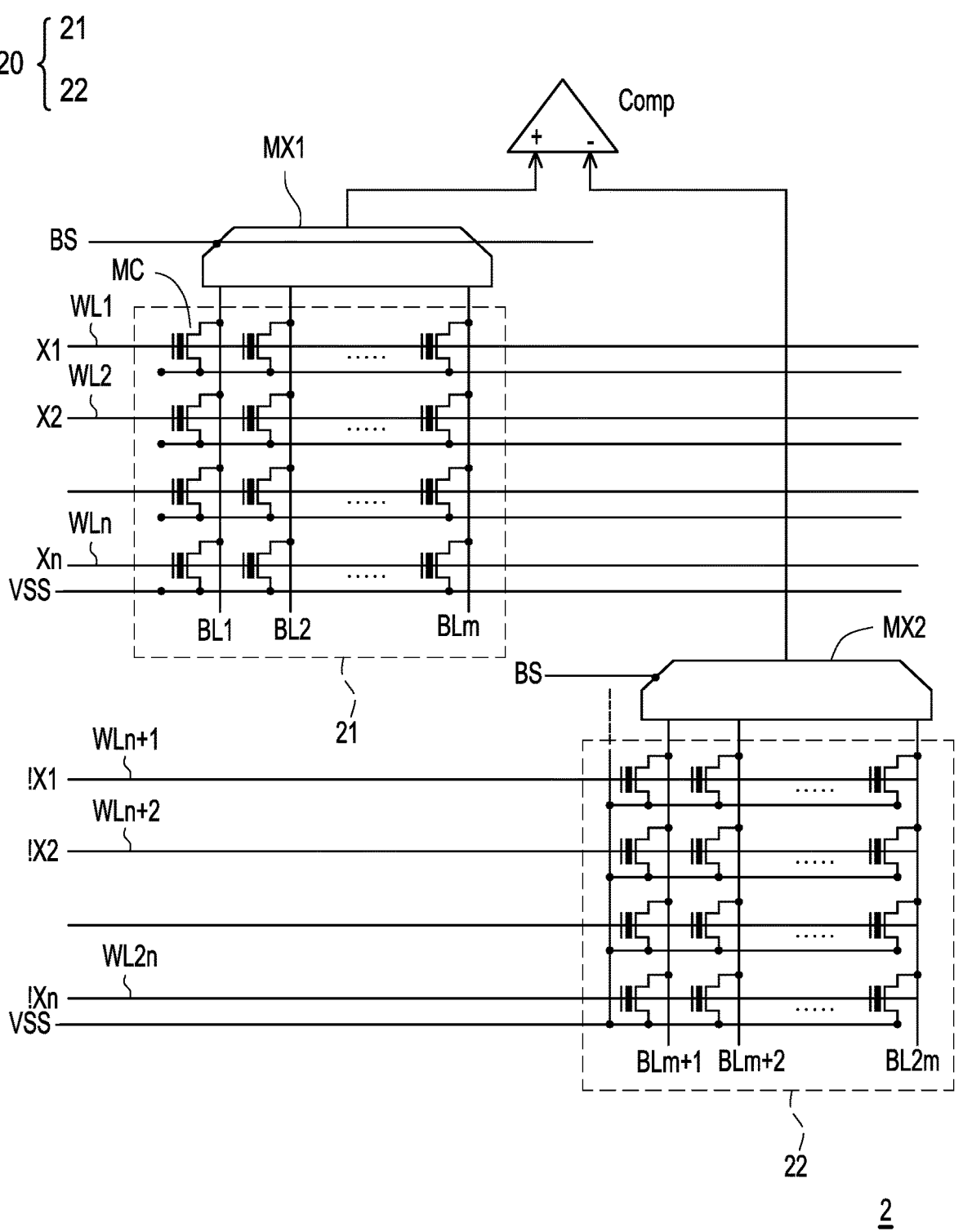
FIG. 2A illustrates a memory device according to some embodiments of the present disclosure.

FIG. 2A illustrates a memory device 2 according to some embodiments of the present disclosure. The memory device 2 includes a memory array 20. The memory array 20 includes memory blocks 21, 22. The memory blocks 21, 22 comprises a plurality of memory cells MC. The memory array 20, the memory blocks 21, 22 as illustrated in FIG. 2A is similar to the memory array 10, the memory blocks 11, 12 as illustrated in FIG. 1A. The difference is that the memory device 2 in FIG. 2A is operated under a second configuration, and the memory blocks 21, 22 store the same first weight matrix, while respectively receiving a first input matrix and a second input matrix. The same or similar content will not be repeated herein.

Specifically, the first input matrix, comprising input values X1-Xn, is provided to the memory block 21, and the second input matrix, comprising input values !X1 to !Xn, is provided to the memory block 22. The first input matrix and the second input matrix are complementary or inverted. The first input matrix and the second input matrix being complementary is that the input values of the first input matrix and the second input matrix at a same position (i.e. at a same column and a same row) are inverted, while one is 1 and another one is 0.

The memory blocks 21, 22 store the same first weight matrix, which are W1,1-Wn,m. The memory blocks 21, 22 each comprises n×m memory cells MC arranged in array formation. The memory block 21 is coupled to word lines WL1-WLn and bit lines BL1-BLm, the memory block 22 is coupled to word lines WLn+1 to WL2n and bit lines BLm+1 to BL2m. Each memory cell MC in the memory block 21 is connected between one of word lines WL1-WLn and one of bit lines BL1-BLm, and each memory cell MC in the memory block 22 is connected between one of word lines WLn+1 to WL2n and one of bit lines BLm+1 to BL2m.

It can be regarded as each memory cell MC performs an AND operation according to the input value received and the weight value stored. Therefore, the current drained from the bit lines BL1-BLm form a first sum matrix, and the current drained from the bit lines BLm+1 to BL2m form a second sum matrix.

The MAC operation performed by the memory blocks 21, 22 can be referred as follows.

$$[X1 \ ... \ Xn] \begin{bmatrix} W1,1 & \cdots & W1,m \\ \vdots & \ddots & \vdots \\ Wn,1 & \cdots & Wn,m \end{bmatrix} = [A1 \ ... \ Am]$$

$$[!X1 \ ... \ !Xn] \begin{bmatrix} W1,1 & \cdots & W1,m \\ \vdots & \ddots & \vdots \\ Wn,1 & \cdots & Wn,m \end{bmatrix} = [B1 \ ... \ Bm]$$

X1-Xn are the input values of the first input matrix. !X1 to !Xn are the input values of the second input matrix, which stores complement or inverted weights of the first input matrix. W1,1 to Wn,m are the weight values of the first weight matrix. A1-Am are sum values of the first sum matrix, and B1-Bm are sum values of the second sum matrix.

In some embodiments, a multiplexer MX1 is coupled to the memory block 21 through bit lines BL1 to BLm, and a multiplexer MX2 is coupled to the memory block 22 through the bit lines BLm+1 to BL2m. The multiplexers MX1 and MX2 are controlled by a bit line select signal BS, so a pair of corresponding bit lines of the memory blocks 21, 22 may be connected to the comparator Comp for comparison simultaneously. For example, at first, the multiplexers MX1, MX2 may respectively select and connect the bit lines BL1, BLm+1 to the comparator Comp for comparison. The comparator Comp receives a first sum from the bit line BL1 and a second sum from the BLm+1 to BL2m. The first sum and the second sum may be respectively converted from the total currents drained from the bit line BL1, BLm+1, which will be described more detailed in paragraphs below. The comparator Comp may compare the first sum and the second sum to generate a comparison result. Then, the multiplexers MX1, MX2 may select and connect the bit lines BL2, BLm+2 to the comparator Comp, and so on, so comparison results of all columns of the first sum matrix and the second sum matrix may be obtained.

Figure 2B:
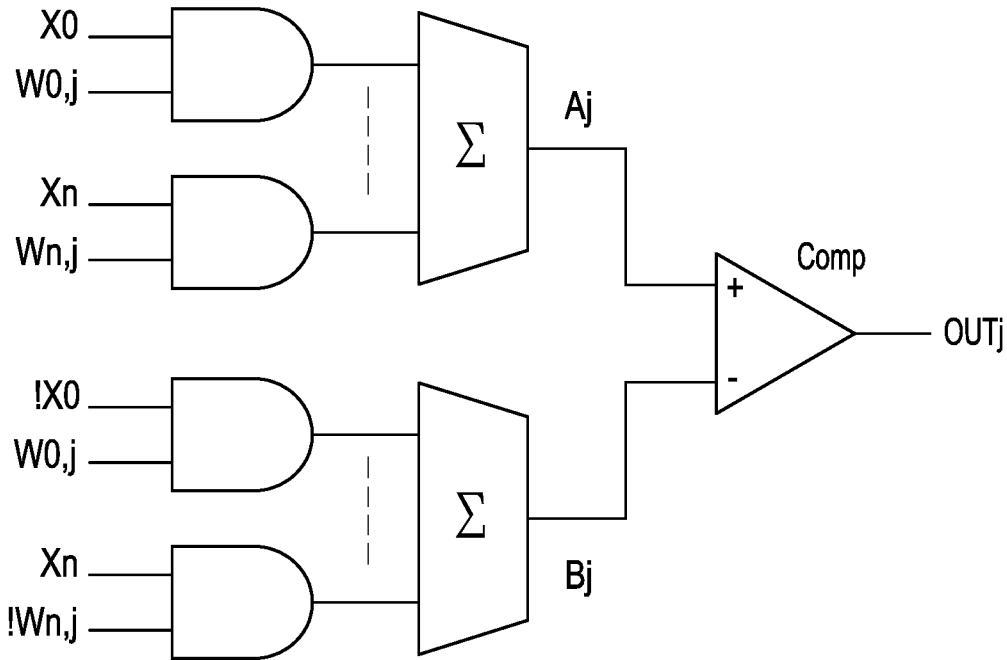
FIG. 2B illustrates an equivalent circuit of how the comparator Comp compares the first sum and the second sum of a selected column as illustrated in FIG. 2A.

FIG. 2B illustrates an equivalent circuit of how the comparator Comp compares the first sum Aj and the second sum Bj of a selected jth column as illustrated in FIG. 2A. Since each memory cell MC in the memory blocks 21, 22 performs the AND operation according to the input values received and the weight value stored, each memory cell MC functions equivalently as an AND gate. The input values of the first input matrix and the second input matrix are respectively ANDed to the weight values of a selected column of the first weight matrix. The products generated by the memory cells MC are being summed on the bit lines and provided to the comparator Comp for generating the comparison result OUTj. Specifically, the first sum Aj corresponds to how many 1s in the first input matrix are matched to the selected column of the first weight matrix, while the second sum Bj corresponds to how many 0s in the first input matrix are unmatched to the selected column of the first weight matrix. In order to compare the amount of the matched 1s and unmatched 0s in the first input matrix, the comparator Comp generates the comparison result OUTj by subtracting the second sum Bj from the first sum Aj. When the first sum Aj is greater than the second sum Bj, that means the amount of matched 1s is greater than the amount of unmatched 0s, the comparator Comp outputs the comparison result OUTj to be 0 (i.e. with a relatively low voltage). When the first sum Aj is less than the second sum Bj, that means the amount of matched 1s is less than the amount of unmatched 0s, the comparator Comp outputs the comparison result OUTj to be 1 (i.e. with a relatively high voltage).

In some embodiments, a comparator threshold of the comparator Comp may be 50%. That is, when the comparison result OUTj is 1, there will be over 50% of 1s in the first input matrix to be matched with the selected column of the first weight matrix. When the comparison result OUTj is 0, there will be less than 50% of 1s in the first input matrix to be matched with the selected column of the first weight matrix.

In brief, the memory device 2 may be operated under the second configuration. In the second configuration, the memory blocks 21, 22 respectively receives the first input matrix and the second input matrix which are complementary or inverted while storing the same first weight matrix. Therefore, the first input matrix and the first weight matrix may be compared through the AND operation to generate the corresponding comparison result OUT.

Figure 3A:
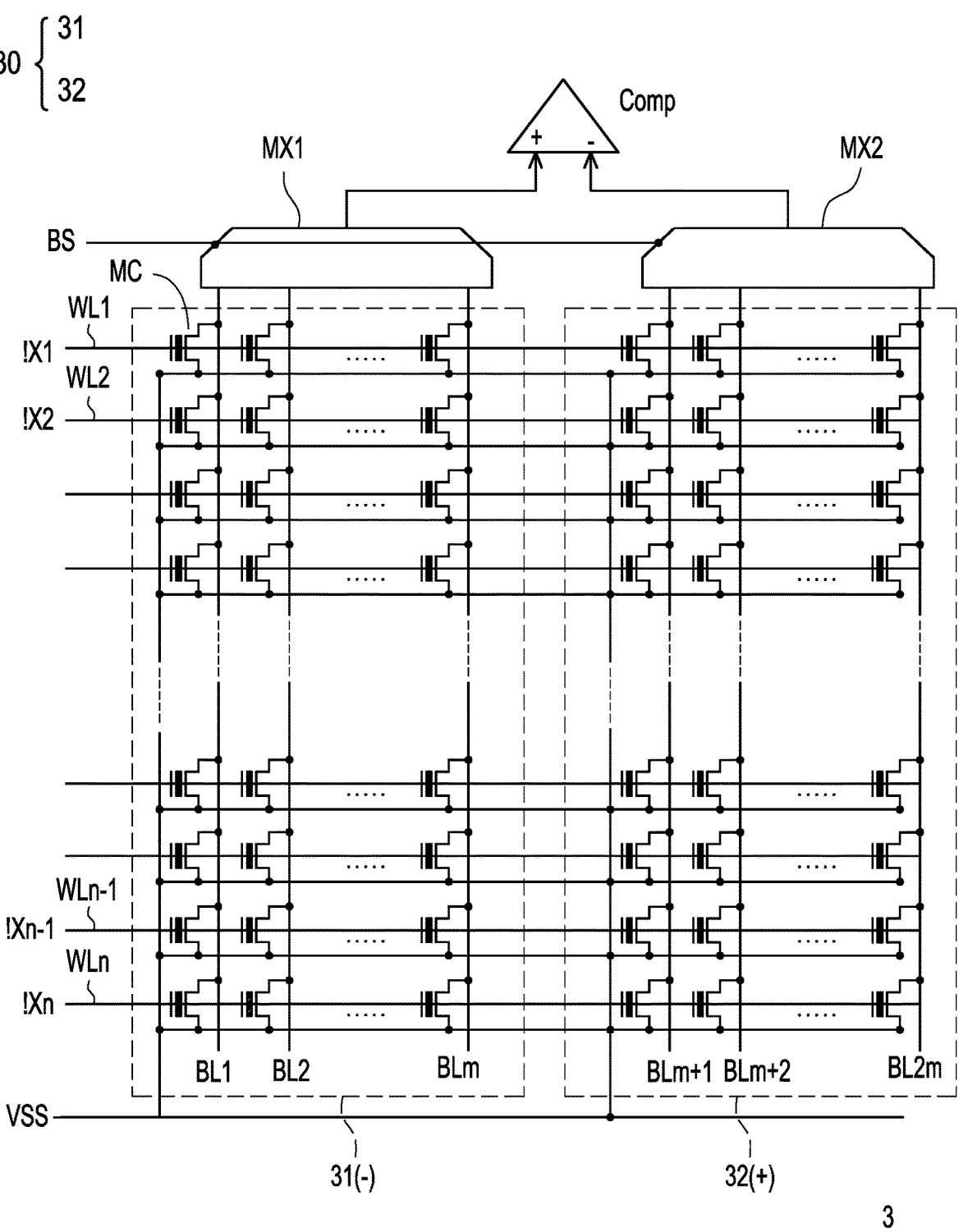
FIG. 3A illustrates a memory device according to some embodiments of the present disclosure.

FIG. 3A illustrates a memory device 3 according to some embodiments of the present disclosure. The memory device 3 includes a memory array 30. The memory array 30 includes memory blocks 31, 32. The memory blocks 31, 32 comprises a plurality of memory cells MC. The memory array 30, the memory blocks 31, 32 operated under the first configuration as illustrated in FIG. 3A are similar to the memory array 10, the memory blocks 11, 12 as illustrated in FIG. 1A. The difference is that the memory blocks 31, 32 receive the same second input matrix while respectively storing the second weight matrix and the first weight matrix. The same or similar content will not be repeated herein.

Specifically, the second input matrix, comprising input values !X1 to !Xn, is provided to the memory blocks 31, 32. Although it is not illustrated in FIG. 3A, the second input matrix is complementary or inverted to a first input matrix. In addition, the second weight matrix stored by the memory block 31 and the first weight matrix stored by the memory block 32 are complementary or inverted as well. Particularly, two matrixes being complementary or inverted is that two values at a same position of the two matrixes (i.e. at a same column and a same row) are inverted, while one is 1 and another one is 0.

Since each memory cell MC in the memory block 31 receives inverted input values of the first input matrix and stores inverted weight values of the first weight matrix, each memory cell MC performs an AND operation according to the inverted input value received and the inverted weight value stored. Equivalently, the AND operation performed based on the inverted input value and the inverted weight value may be converted as a NOR operation performed based on the input value of the first input matrix and the weight value of the first weight matrix. Therefore, the memory cell drains a current from the bit line when both the input value of the first input matrix and the weight value of the first weight matrix are 0. The memory cells MC in the same column perform respective NOR operation to determine whether to drain a current from the same bit line. The total current drained from each bit line corresponds to a sum of NOR operation performed by each column. Therefore, the current drained from the bit lines BL1-BLm form a first sum matrix, and the current drained from the bit lines BLm+1 to BL2m form a second sum matrix.

The NOR and sum operation performed by the memory blocks 31, 32 can be referred as follows.

$$[!X1 \ ... \ !Xn]\begin{bmatrix} !W1,1 & \cdots & !W1,m \\ \vdots & \ddots & \vdots \\ !Wn,1 & \cdots & !Wn,m \end{bmatrix} = [A1 \ ... \ Am]$$

$$[!X1 \ ... \ !Xn]\begin{bmatrix} W1,1 & \cdots & W1,m \\ \vdots & \ddots & \vdots \\ Wn,1 & \cdots & Wn,m \end{bmatrix} = [B1 \ ... \ Bm]$$

!X1 to !Xn are the input values of the second input matrix. W1,1 to Wn,m are the weight values of the first weight matrix, and !W1,1 to !Wn,m are the weight values of the second weight matrix A1-Am are sum values of the first sum matrix, and B1-Bm are sum values of the second sum matrix.

Figure 3B:
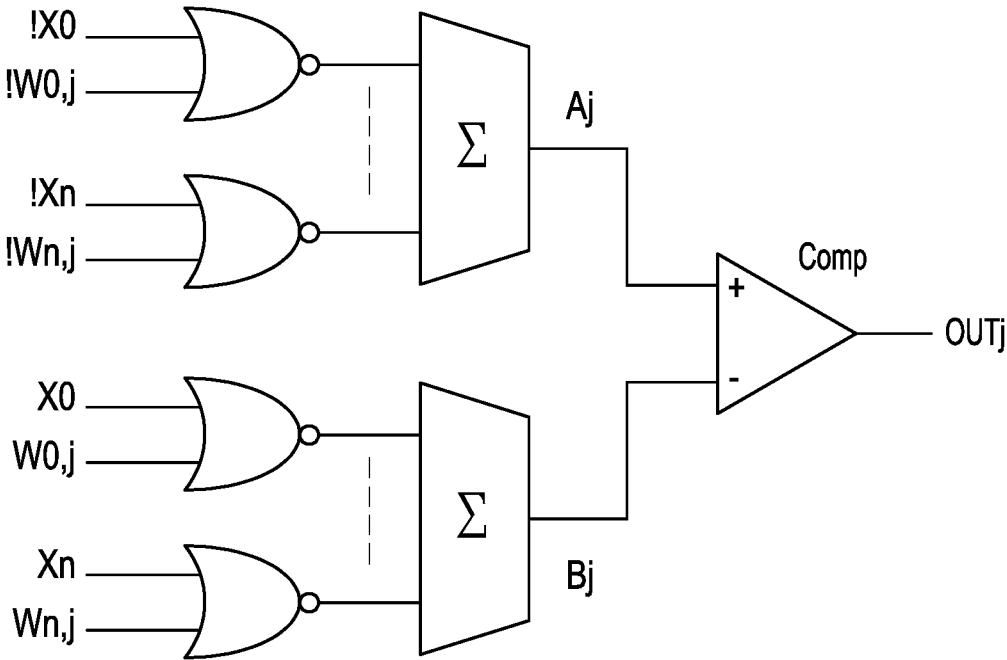
FIG. 3B illustrates an equivalent circuit of how the comparator Comp compares the first sum and the second sum of a selected column as illustrated in FIG. 3A.

FIG. 3B illustrates an equivalent circuit of how the comparator Comp compares the first sum Aj and the second sum Bj of a selected jth column as illustrated in FIG. 3A. Since each memory cell MC in the memory blocks 31, 32 performs the NOR operation according to the input value of the first input matrix and the weight value of the first weight matrix, each memory cell MC is functioned equivalently as a NOR gate to generate output values according to the input values of the first input matrix and the weight values of the first weight matrix. The NOR result generated by the memory cells MC are being summed up on the bit lines and provided to the comparator Comp for generating the comparison result OUTj. Specifically, the first sum Aj corresponds to how many 0s in the first input matrix are matched to the selected column of the first weight matrix, while the second sum Bj corresponds to how many 0s in the second input matrix are unmatched to the selected column of the first weight matrix. In order to compare the amount of the matched 0s and unmatched 0s in the second input matrix, the comparator Comp generates the comparison result OUTj by subtracting the second sum Bj from the first sum Aj. When the first sum Aj is greater than the second sum Bj, that means the amount of matched 0s is greater than the amount of unmatched 0s, the comparator Comp outputs the comparison result OUTj to be 0 (i.e. with a relatively low voltage). When the first sum Aj is less than the second sum Bj, that means the amount of matched 0s is less than the amount of unmatched 0s, the comparator Comp outputs the comparison result OUTj to be 1 (i.e. with a relatively high voltage).

In some embodiments, a comparator threshold of the comparator Comp may be 50%. That is, when the comparison result OUTj is 1, there will be over 50% of 1s in the second input matrix to be matched with the selected column of the first weight matrix. When the comparison result OUTj is 0, there will be less than 50% of 1s in the second input matrix to be matched with the selected column of the first weight matrix.

In brief, the memory device 3 may be operated under the first configuration. In the first configuration, the memory blocks 31, 32 respectively stores the second weight matrix and the first weight matrix which are complementary or inverted while receiving the same second input matrix. Therefore, the first input matrix and the first weight matrix may be compared through the NOR operation to generate the corresponding comparison result OUT.

Figure 4A:
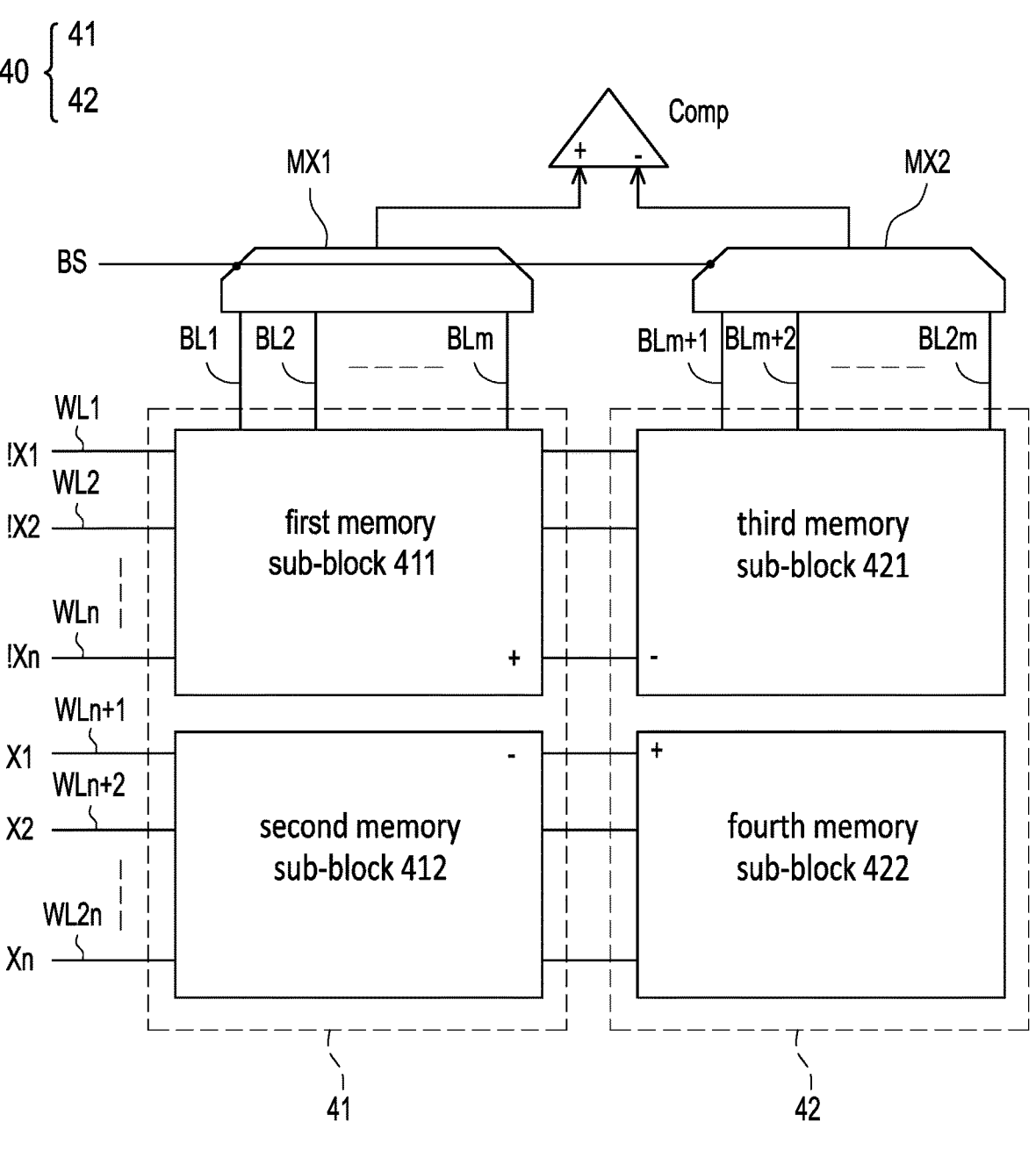
FIG. 4A illustrates a memory device according to some embodiments of the present disclosure.

FIG. 4A illustrates a memory device 4 according to some embodiments of the present disclosure. The memory device 4 includes a memory array 40. The memory array 40 includes memory blocks 41, 42. The memory device 4 may be operated under the first configuration, which the memory blocks 41, 42 receive a same input matrix but store complementary or inverted weight matrixes. Two matrixes being complementary or inverted is that two values at a same position of the two matrixes (i.e. at a same column and a same row) are inverted, while one is 1 and another one is 0.

The memory blocks 41, 42 are comprised a plurality of memory cells, which are omitted for ease of understanding. The memory cells of the memory block 41 are divided in to a first memory sub-block 411 and a second memory sub-block 412. The memory cells of the memory block 42 are divided into a third memory sub-block 421 and a fourth memory sub-block 422. The first memory sub-block 411 and the fourth memory sub-block 422 store a same first weight sub-matrix. The second memory sub-block 412 and the third memory sub-block 421 store a same second weight sub-matrix. A first input matrix is inputted to the memory blocks 41, 42. Specifically, a first input sub-matrix, comprising input values !X1 to !Xn, are provided to the first memory sub-block 411 and the third memory sub-block 421 through the word lines WL1 to WLn. A second input sub-matrix, comprising input values X1 to Xn, are provided to the second memory sub-block 412 and the fourth memory sub-block 422 through the word lines WLn+1 to WL2n.

The operation of the memory block 41 may be referred s follow.

$$[!X1 \ ... \ !Xn]\begin{bmatrix} W1,1 & \cdots & W1,m \\ \vdots & \ddots & \vdots \\ Wn,1 & \cdots & Wn,m \end{bmatrix} + [X1 \ ... \ Xn]$$

-continued $$\begin{bmatrix} !W1,1 & \cdots & !W1,m \\ \vdots & \ddots & \vdots \\ !Wn,1 & \cdots & !Wn,m \end{bmatrix} = [A1 \ \ldots \ Am]$$

X1-Xn are the input values of the first input matrix. !X1 to !Xn are the input values of the second input matrix, which stores complement or inverted weights of the first input matrix. W1,1 to Wn,m are the weight values of the first weight matrix, and !W1,1 to !Wn,m are the weight values of the second weight matrix. A1-Am are sum values of the first sum matrix generated by the memory sub-block 41. Therefore, operations of the memory block 41 function equivalently as performing an XOR operation according to the second input sub-matrix and the first weight sub-matrix.

In addition, the operation of the memory block 42 may be referred s follow.

$$[!X1 \ \ldots \ !Xn]\begin{bmatrix} !W1,1 & \cdots & !W1,m \\ \vdots & \ddots & \vdots \\ !Wn,1 & \cdots & !Wn,m \end{bmatrix} + [X1 \ \ldots \ Xn]$$

$$\begin{bmatrix} W1,1 & \cdots & W1,m \\ \vdots & \ddots & \vdots \\ Wn,1 & \cdots & Wn,m \end{bmatrix} = [B1 \ \ldots \ Bm]$$

X1-Xn are the input values of the first input matrix. !X1 to !Xn are the input values of the second input matrix, which stores complement or inverted weights of the first input matrix. W1,1 to Wn,m are the weight values of the first weight matrix, and !W1,1 to !Wn,m are the weight values of the second weight matrix. B1-Bm are sum values of the second sum matrix generated by the memory block 42. Therefore, operations of the memory block 42 function equivalently as performing an XNOR operation according to the second input sub-matrix and the first weight sub-matrix.

Figure 4B:
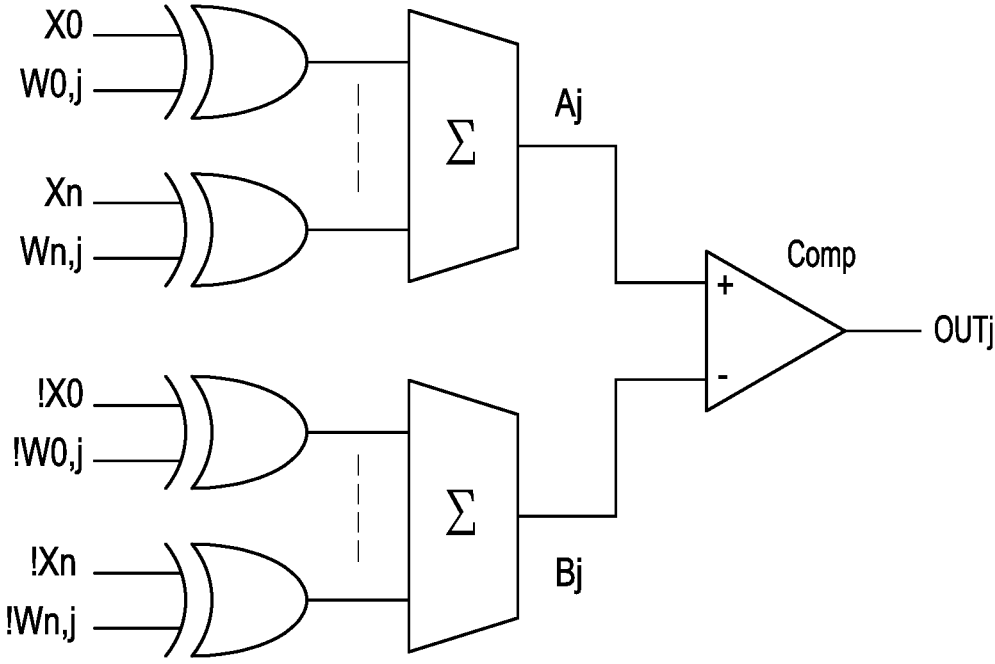
FIG. 4B illustrates an equivalent circuit of how the comparator Comp compares the first sum and the second sum of a selected column as illustrated in FIG. 4A.

FIG. 4B illustrates an equivalent circuit of how the comparator Comp compares the first sum Aj and the second sum Bj of a selected jth column as illustrated in FIG. 4A. For the memory block 41, the input values are respectively XORed to the corresponding weight value, and summed up on the selected jth bit line. For the memory block 42, the input values are respectively XNORed to the corresponding weight value, and summed up on the selected jth bit line. The XOR and XNOR results generated by the memory cells MC are being summed up on respective bit lines and provided to the comparator Comp for generating the comparison result OUTj. Specifically, the first sum Aj corresponds to how many 0s and is in the second input sub-matrix are matched to the selected column of the first weight sub-matrix, while the second sum Bj corresponds to how many 0s and is in the second input sub-matrix are unmatched to the selected column of the first weight sub-matrix. In order to compare the amount of the matched bits and unmatched bits, the comparator Comp generates the comparison result OUTj by subtracting the second sum Bj from the first sum Aj. When the first sum Aj is greater than the second sum Bj, that means the amount of matched bits is greater than the amount of unmatched bits, the comparator Comp outputs the comparison result OUTj to be 0 (i.e. with a relatively low voltage). When the first sum Aj is less than the second sum Bj, that means the amount of matched bits is less than the amount of unmatched bits, the comparator Comp outputs the comparison result OUTj to be 1 (i.e. with a relatively high voltage).

In some embodiments, a comparator threshold of the comparator Comp may be 50%. That is, when the comparison result OUTj is 1, there will be over 50% of 1s in the second input matrix to be matched with the selected column of the first weight matrix. When the comparison result OUTj is 0, there will be less than 50% of 1s in the second input matrix to be matched with the selected column of the first weight matrix.

Figure 5A:
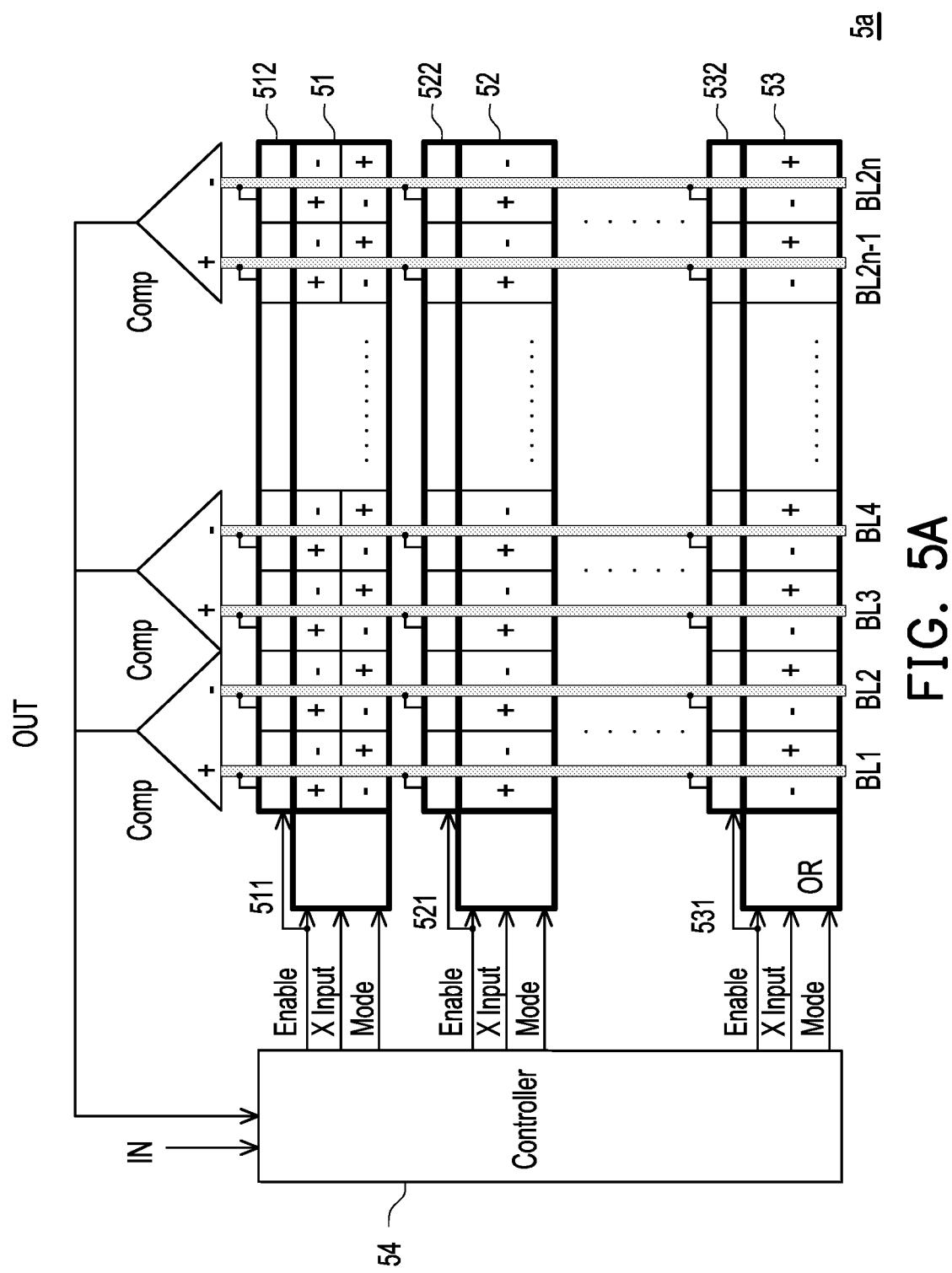
FIG. 5A illustrates a memory device according to some embodiments of the present disclosure.

FIG. 5A illustrates a memory device 5a according to some embodiments of the present disclosure. The memory device 5a includes memory arrays 51-53, decoders 511, 512, 521, 522, 531, 532, comparators Com and a controller 54. The memory array 51 illustrated in FIG. 5A may be similar to the memory array 40 as illustrated in FIG. 4A, in order to perform the XOR operation. The memory array 52 illustrated in FIG. 5A may be similar to the memory array 10 as illustrated in FIG. 1A, in order to perform the AND operation. The memory array 53 illustrated in FIG. 5A may be similar to the memory array 30 as illustrated in FIG. 3A, in order to perform the OR operation.

Specifically, there are multiple comparators Comp coupled to the memory arrays 51-53, and each comparator Comp are connected to the memory arrays 51-53 through two bit lines. Therefore, the plurality of comparators Comp may simultaneously generate comparison results to achieve parallelism calculation. In addition, operations of the memory array 51 is controlled by an X decoder 511 and a Y decoder 522. Similarly, operations of the memory arrays 52, 53 are controlled by X decoders 521, 531, and Y decoders 522, 532. The controller 54 may control the X decoders 511, 521, 531, and the Y decoders 512, 522, 532 for selecting one or more logic operations performed on the bit lines BL1-BL2n. In some embodiments, by taking advantage of the X decoders 511, 521, 531, the Y decoders 512, 522, 532, and the plurality of comparators Comp, the memory device 5a may be utilized for polynomial calculation.

In some embodiments, the comparison results may be feedback to the controller 54, so the controller 54 may control subsequent operations of the memory arrays 51-53, and the decoders 511-531, 512-532 according to the feedback comparison results and inputs IN.

Figure 5B:
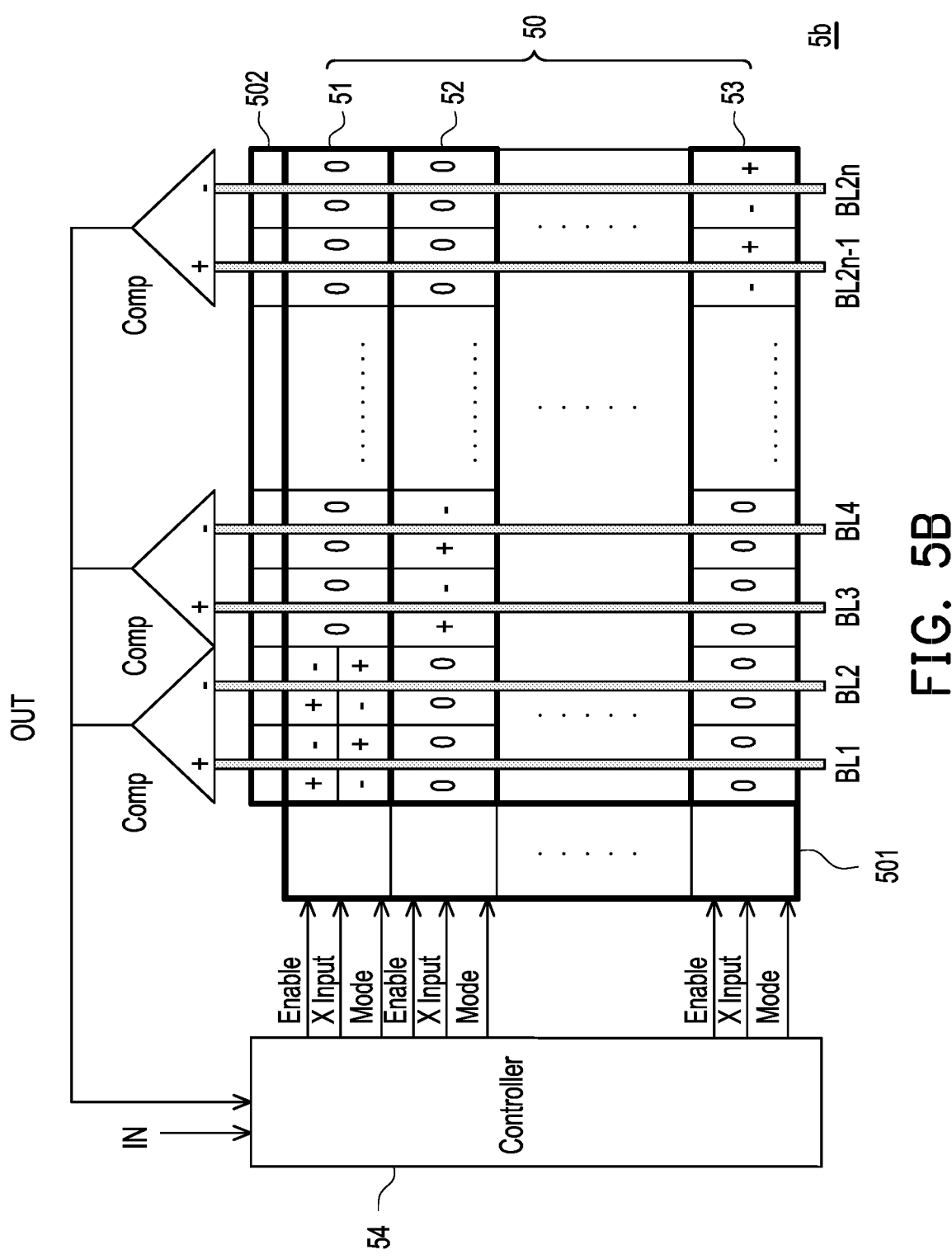
FIG. 5B illustrates a memory device according to some embodiments of the present disclosure.

FIG. 5B illustrates a memory device 5b according to some embodiments of the present disclosure. The memory device 5b as illustrated in FIG. 5B is similar to the memory device 5a as illustrated. The difference is that the memory arrays 51-53 in FIG. 5B are merged and combined as one memory array 50.

Specifically, operations of the memory array 50 is controlled by an X decoder 501 and a Y decoder 502. Without separate Y decoders directly connecting to each of the memory arrays 51-53, with regard to a selected bit line, all memory arrays connected to the selected bit line will be enabled and the outputs will be summed up once the corresponding Y decoder is enabled. In order to generate required output Boolean functions, the controller 54 will only provide the input matrix to the memory arrays selected, and provide zero matrix to the memory arrays unselected.

Figure 6A:
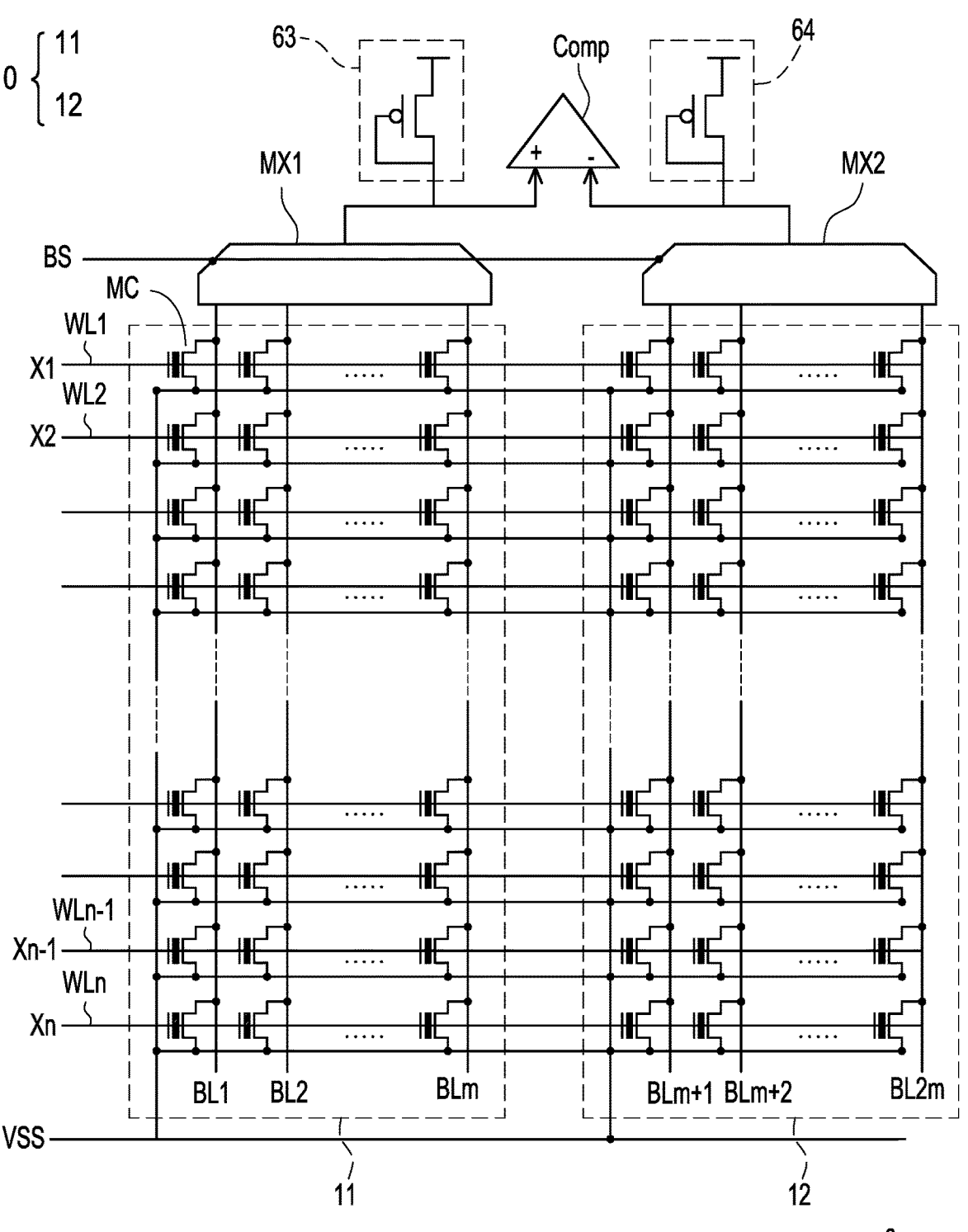
FIG. 6A illustrates a memory device according to same embodiments of the present disclosure.

FIG. 6A illustrates a memory device 6a according to same embodiments of the present disclosure. The memory device 6a as illustrated in FIG. 6A is similar to the memory device 1 as illustrated in FIG. 1A, except that the memory device 6a in FIG. 6A additionally comprises loads 63, 64.

In some embodiments, the loads 63, 64 may be utilized for adjusting comparator thresholds of the comparator Comp. Specifically, the loads 63, 64 are respectively connected to the positive input end and the negative input end of the comparator Comp. For the positive input end of the comparator, a bias voltage is generated according to the resistance of the load 63 and the amount of turned on memory cells MC. The more memory cells MC in the selected bit line being turned on, the lower the bias voltage is pulled down. Therefore, summation currents generated by the memory blocks 11, 12 on the two selected bit lines may be converted into voltage signals. Thus, the comparator Comp may compare the voltages received from the positive input end and the negative input end to generate the comparison result Comp.

Moreover, by adjusting resistance of the loads 63, 64, the comparator threshold of the comparator Comp may be adjusted. In some embodiments, the loads 63, 64 are active loads implemented by PMOS, and the resistances of the loads may be adjusted by changing their W/L ratio. In some embodiments, the comparator Comp may be ideal and resistances of the loads 63, 64 are equal, and the comparator threshold is 50%. However, in some embodiments, when the loads 63, 64 are adjusted to be 2:1, 3:1, 4:1, 7:1, 9:1, 3:2, the comparator threshold may respectively be 66.6%, 75%, 80%, 87.5%, 90%, 60. Of course, different ratios between the loads 63, 64 are within the scope of various embodiments.

Figure 6B:
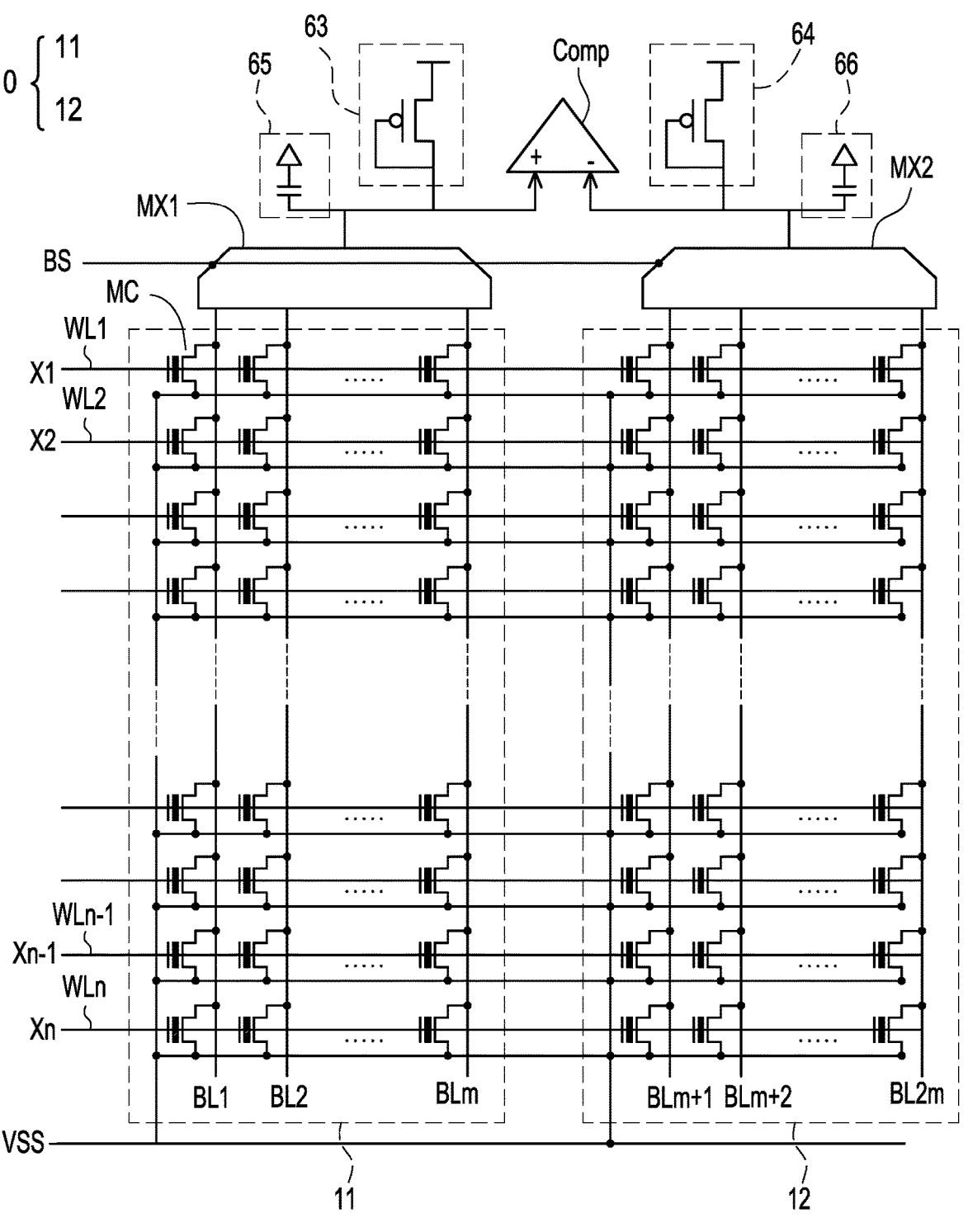
FIG. 6B illustrates a memory device according to same embodiments of the present disclosure.

FIG. 6B illustrates a memory device 6b according to same embodiments of the present disclosure. The memory device 6b as illustrated in FIG. 6B is similar to the memory device 6a as illustrated in FIG. 6A, except loads 65, 66 are added in FIG. 6B.

In some embodiments, the resistance of the loads 63, 64 are equivalent. The loads 65, 66 may be utilized for adjusting comparator thresholds of the comparator Comp. In some embodiments, the loads 65, 66 are capacitive loads implemented by capacitors. Initially, the loads 65, 66 may be precharged to a predetermined voltage. After the memory cells MC on the selected bit lines have received the input values, the voltage of the positive input end and the negative input end are pulled down by the memory cells MC. Therefore, the voltages provided to the positive input end and the negative input end of the comparator Comp are determined according to the capacitance of the loads 65, 66, and the amount of turned on memory cells MC on the selected bit line. Thus, the comparator thresholds may be adjusted by varying the capacitance of the loads 65, 66. When the capacitances of the loads 65, 66 are adjusted to be 2:1, 3:1, 4:1, 7:1, 9:1, 3:2, the comparator threshold may respectively be 66.6%, 75%, 80%, 87.5%, 90%, 60. Of course, different ratios between the loads 65, 66 are within the scope of various embodiments.

FIG. 7 illustrates a flowchart of a computing method according to some embodiments of the present disclosure. The flowchart may be implemented by the memory devices described in the above paragraphs. Overall, operation of the memory device in the above paragraphs may be summarized as the flowchart of FIG. 7. The computing method includes steps S71-S74. In step 571, a memory array comprising a first memory block and a second memory block respectively storing a first weight matrix and a second weight matrix is provided. In step S72, a multiplication and accumulation (MAC) operation is performed by the first memory block according to the first weight matrix and a first input matrix to generate a first sum. In step S73, the MAC operation is performed by the second memory block according to the second weight matrix and a second input matrix to generate a second sum. In step S74, the first sum and the second sum are compared by a comparator to generate a comparison result. Specifically, the computing method may be operated in a first configuration or a second configuration. In the first configuration, each value of the first input matrix and the second input matrix are the same and each value of the first weight matrix and the second weight matrix are complements. In the second configuration, each value of the first input matrix and the second input matrix are complements and each value of the first weight matrix and the second weight matrix are the same. Please refer to above paragraphs describing operations of the memory device for detailed operations of steps S71-S74, which is omitted herein.

In summary, the memory device and the computing method according to embodiments of the present disclosure performs comparison on input values and weight values by using various Boolean logic operations through in memory computation. Since the comparison between the input values and the weight values may be applied to different applications, such as image recognition, fingerprint identification, voice recognition, speech recognition, etc. Therefore, the memory device and the computing method may effectively reduce design complexity while increasing computation speed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory device, comprising:
 a memory array, comprising:
 a first memory block, storing a first weight matrix, receiving a first input matrix, and performing a multiplication and accumulation (MAC) operation according to the first weight matrix and the first input matrix to generate a first sum; and
 a second memory block, storing a second weight matrix, receiving a second input matrix, and performing the MAC operation according to the second weight matrix and the second input matrix to generate a second sum; and
 a comparator, configured to compare the first sum and the second sum to generate a comparison result,
 wherein in a first configuration, each value of the first input matrix and the second input matrix are the same and each value of the first weight matrix and the second weight matrix are complements,
 wherein in a second configuration, each value of the first input matrix and the second input matrix are complements and each value of the first weight matrix and the second weight matrix are the same.

2. The memory device of claim 1, wherein the first memory block and the second memory are coupled to the comparator respectively through a first bit line and a second bit line,
 wherein the first sum corresponds to total current drained from the first bit line and the second sum corresponds to total current drained from the second bit line,
 wherein the comparator generates the comparison result by subtracting the second sum from the first sum.

3. The memory device of claim 1, wherein in the first configuration and the second configuration, the first memory block performs an AND operation on each value of the first input matrix and the first weight matrix, the second memory block performs the AND operation on each value of the second input matrix and the second weight matrix, wherein the comparator generates the comparison result to compare each value of the first input matrix with the first weight matrix through the AND operation.

4. The memory device of claim 1, wherein in the first configuration, each value of the first input matrix provided to the first memory block and the second memory block are complements to each value of a third input matrix, and the first memory block performs a NOR operation on each value of the third input matrix and the second weight matrix, the second memory block performs the NOR operation on each value of the third input matrix and the first weight matrix.

5. The memory device of claim 1, wherein in the first configuration, the first input matrix comprises a first input sub-matrix and a second input sub-matrix, and the first weight matrix comprises a first weight sub-matrix and a second weight sub-matrix, wherein each value of the first input sub-matrix and the second input sub-matrix are complements, each value of the first weight sub-matrix and the second weight sub-matrix are complements.

6. The memory device of claim 5, wherein the first memory block comprises:
a first memory sub-block, configured to store the first weight sub-matrix and receive the first input sub-matrix; and
a second memory sub-block, configured to store the second weight sub-matrix and receive the second input sub-matrix, wherein the first memory block performs an XOR operation on each value of the second input sub-matrix and the first weight sub-matrix,
wherein the second memory block comprises:
a third memory sub-block, configured to store the second weight sub-matrix and receive the first input sub-matrix; and
a fourth memory sub-block, configured to store the first weight sub-matrix and receive the second input sub-matrix, wherein the second memory block performs an XNOR operation on each value of the second input sub-matrix and the first weight sub-matrix.

7. The memory device of claim 1, wherein the memory array comprises a plurality of memory function blocks, for performing different logic operations on each value of the first input matrix and the first weight matrix.

8. The memory device of claim 2, further comprising a first load and a second load, respectively coupled to the first bit line and the second bit line,
wherein a first ratio between voltage of the first bit line and the total current drained from the first bit line is adjusted according to the first load,
wherein a second ratio between voltage of the second bit line and the total current drained from the second bit line is adjusted according to the second load.

9. The memory device of claim 8, wherein the first load and the second load are pull up loads or capacitors.

10. A computing method, comprising:
providing a memory array comprising a first memory block and a second memory block respectively storing a first weight matrix and a second weight matrix;
performing, by the first memory block, a multiplication and accumulation (MAC) operation according to the first weight matrix and a first input matrix to generate a first sum;
performing, by the second memory block, the MAC operation according to the second weight matrix and a second input matrix to generate a second sum;
comparing, by a comparator, the first sum and the second sum to generate a comparison result, wherein in a first configuration, each value of the first input matrix and the second input matrix are the same and each value of the first weight matrix and the second weight matrix are complements,
wherein in a second configuration, each value of the first input matrix and the second input matrix are complements and each value of the first weight matrix and the second weight matrix are the same.

11. The computing method of claim 10, wherein the first memory block and the second memory are coupled to the comparator respectively through a first bit line and a second bit line,
wherein the first sum corresponds to total current drained from the first bit line and the second sum corresponds to total current drained from the second bit line,
wherein the comparator generates the comparison result by subtracting the second sum from the first sum.

12. The computing method of claim 10, wherein in the first configuration and the second configuration, the first memory block performs an AND operation on each value of the first input matrix and the first weight matrix, the second memory block performs the AND operation on each value of the second input matrix and the second weight matrix,
wherein the comparator generates the comparison result to compare each value of the first input matrix with the first weight matrix through the AND operation.

13. The computing method of claim 10, wherein in the first configuration, each value of the first input matrix provided to the first memory block and the second memory block are complements to each value of a third input matrix, and the first memory block performs a NOR operation on each value of the third input matrix and the second weight matrix, the second memory block performs the NOR operation on each value of the third input matrix and the first weight matrix.

14. The computing method of claim 10, wherein in the first configuration, the first input matrix comprises a first input sub-matrix and a second input sub-matrix, and the first weight matrix comprises a first weight sub-matrix and a second weight sub-matrix, wherein each value of the first input sub-matrix and the second input sub-matrix are complements, each value of the first weight sub-matrix and the second weight sub-matrix are complements.

15. The computing method of claim 14, comprising:
storing, by a first memory sub-block of the first memory block, the first weight sub-matrix and receiving the first input sub-matrix;
storing, by a second memory sub-block of the first memory block, the second weight sub-matrix and receiving the second input sub-matrix, wherein the first memory block performs an XOR operation on each value of the second input sub-matrix and the first weight sub-matrix;
storing, by a third memory sub-block of the second memory block, the second weight sub-matrix and receiving the first input sub-matrix; and
storing, a fourth memory sub-block of the second memory block, the first weight sub-matrix and receiving the second input sub-matrix, wherein the second memory block performs an XNOR operation on each value of the second input sub-matrix and the first weight sub-matrix.

16. The computing method of claim 10, further comprising performing, by a plurality of memory function blocks of the memory array, different logic operations on each value of the first input matrix and the first weight matrix.

17. The computing method of claim 11, wherein a first load and a second load are, respectively coupled to the first bit line and the second bit line, wherein a first ratio between voltage of the first bit line and the total current drained from the first bit line is adjusted according to the first load, wherein a second ratio between voltage of the second bit line and the total current drained from the second bit line is adjusted according to the second load.

* * * * *